United States Patent Office 3,547,836
Patented Dec. 15, 1970

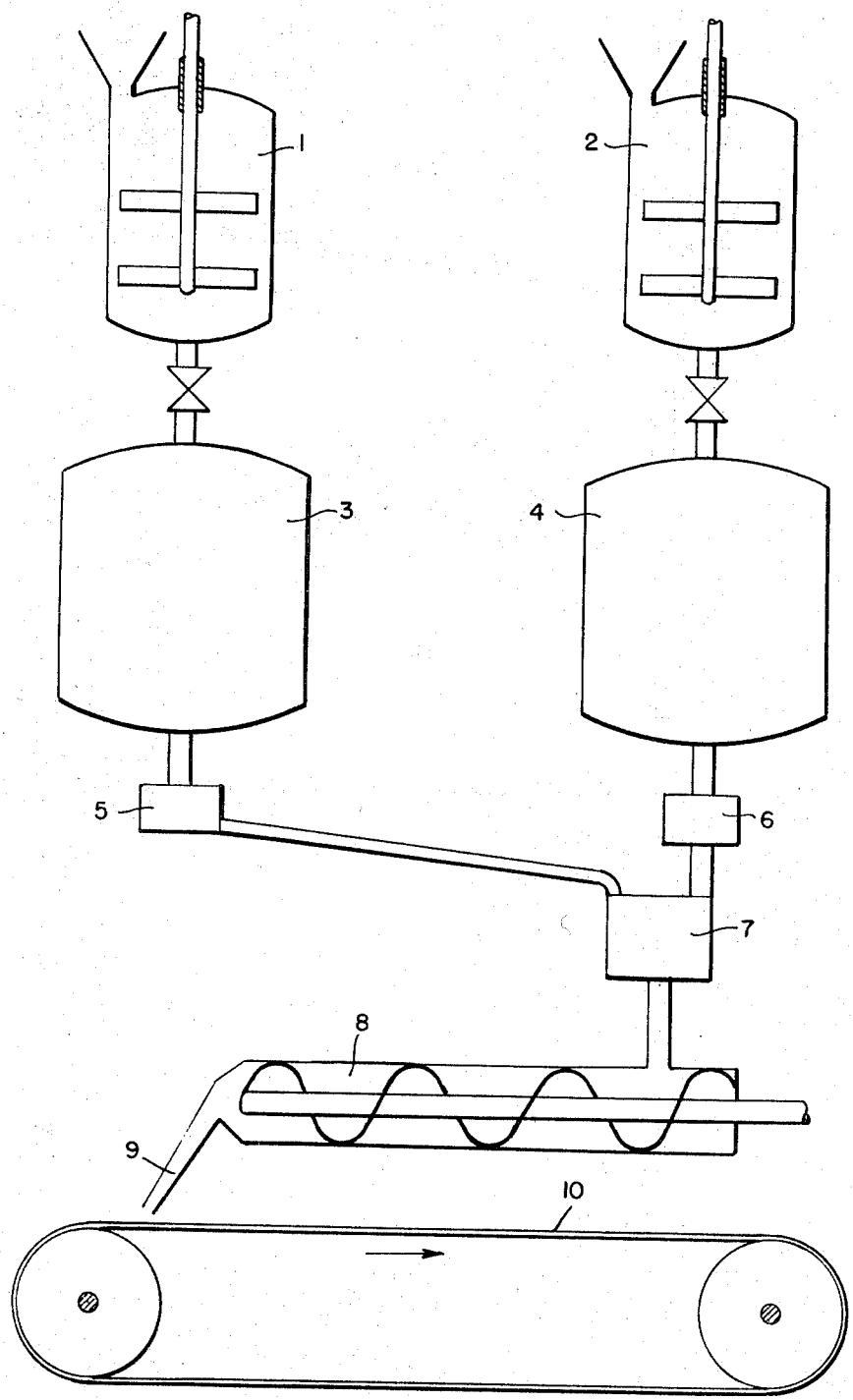

3,547,836
MANUFACTURE OF EXPANDED POLYAMIDES
Horst Brueggemann and Karl Dachs, Ludwigshafen (Rhine), Erich Schwartz, Mannheim, and Hans Wilhelm, Ludwigshafen (Rhine), Germany, assignors to Badische Anilin- & Soda-Fabrik Aktiengesellschaft, Ludwigshafen (Rhine), Germany
Filed Sept. 25, 1961, Ser. No. 140,434
Int. Cl. C08q 20/00; C08f 47/10; C08j 1/26
U.S. Cl. 260—2.5                                    12 Claims

ABSTRACT OF THE DISCLOSURE

The invention relates to a process of heating a lactam monomer in the presence of a blowing agent in order to simultaneously polymerize and foam said admixture.

---

This invention relates to an improved process for the manufacture of expanded polyamides.

Several processes are known for the manufacture of expanded polyamides. Polyamide-forming compounds may be polymerized in the presence of an expanding agent. In this process, polymerization is performed at high temperatures of from 200° to 250° C. and during relatively long periods, usually several hours. Under these conditions the expanding agent must not develop its expanding action. The known processes are difficult to carry out and have not achieved any industrial significance.

The object of the present invention is a simple process for producing expanded polyamides from polyamide-forming compounds in a single operation.

The object of the invention is achieved by intimately mixing lactams with at least 7 ring members with substances having expanding action when heated and polymerizing the lactams in this mixture at a temperature above their melting point by means of alkaline reaction initiators with foaming up of the melt.

The alkaline polymerization of lactams usually proceeds very rapidly. In less than one minute melts can be obtained which have a sufficiently high viscosity for expansion. Therefore, for the process according to the invention it is not necessary to use expanding agents which only act at temperatures above the softening point of the polyamides used.

Readily volatile liquids which boil at temperatures below the softening point of the polyamides used are suitable as expanding agents. We prefer liquids which are soluble in the molten lactams but which are not solvents for the polyamides. Suitable liquid expanding agents are aliphatic and cycloaliphatic hydrocarbons, for example hexane, octane and cyclohexane, aromatic hydrocarbons, for example benzene and toluene, as well as open-chain and cyclic ethers, for example dibutyl ether and dioxane. Very low-boiling liquids, for example pentane, are also suitable, provided mixing with the lactam is carried out under pressure and the lactam is polymerized at least partly under pressure. Hydroxyl compounds, for example methanol or ethanol, are not suitable as expanding agents since they disturb the alkaline polymerization.

There may also be used as the expanding agent solid compounds which decompose on heating with the evolution of gas, for example azoisobutyronitrile, benzenesulfonic acid hydrazide and arylsulfazides. Mixtures of solid and liquid expanding agents are also very effective. With 100 parts by weight of lactam there may be used about 1 to 15 parts by weight of expanding agent. Advantageously 2 to 8 parts by weight is used. The alkaline polymerization can be performed in the usual manner by heating anhydrouls lactam melts containing about 0.05 to 5% by weight of an alkaline reaction initiator for some minutes at temperatures between the melting point of the lactam and about 300° C. At least toward the end of the polymerization, the polymerization temperature should lie above the temperature at which the expanding agent is effective, i.e., in the case of liquid expanding agents, above the boiling point of the liquids and, in the case of solid substances which decompose on heating with the evolution of gas, above the decomposition temperature under the process conditions. Temperatures between 100° and 180° C. are preferred. Suitable alkaline reaction initiators are alkali metals and alkaline earth metals or alkaline-reacting compounds of alkali metals or alkaline earth metals, for example alkalilactam compounds, potassium hydroxide, potassium carbonate, sodium methylate, sodium amide or calcium oxide.

According to a particularly advantageous method there are used, in addition to the alkaline reaction initiators, compounds which accelerate the alkaline polymerization of lactams, so-called polymerization activators. Suitable polymerization activators are acid derivatives, for example carboxylic acid halides, carboxylic acid esters, acid anhydrides, isocyanuric acid esters, and isothiocyanuric acid esters, also cyanamides and carbodi-imides. It is advantageous to use substituted ureas, thioureas, guanidines or urethanes as activators. With these it is not necessary to start from anhydrous lactam melts, but alkaline polymerization of commercial lactams is possible without drying.

Suitable lactams are particularly those from $\omega$-aminocarboxylic acids with at least 7 ring members, preferably 7 to 13 ring members, for example caprolactam, oenanthic lactam, caprylic lactam and lauric lactam, or mixtures of these. C-substituted lactams, for example 4-isopropylcaprolactam may also be used. The lactams may be mixed with the usual additives, such as dyes, fillers or stabilizers. By the addition of very finely-divided solid materials, such as kieselguhr or animal charcoal, the formation of homogeneous, fine cells can be promoted.

The manufacture of expanded articles can be effected by dissolving an expanding agent in a catalyst-containing lactam melt which is at a temperature below the polymerization temperature. Liquid expanding agents should boil at a temperature near the polymerization temperature, i.e., above the temperature of the lactam melt. The boiling temperature of the expanding agent is that at which the liquid dissolved in the lactam or polyamide boils. The boiling temperatures usually lie considerably above the boiling points of the pure liquid blowing agents. In addition, they can be raised by the application of pressure or lowered by means of reduced pressure. The lactam melt containing the expanding agent can then be put into molds and polymerized therein, with or without heating. The molds may be open or closed. As a rule, polymerization is complete within a few minutes. Simultaneously, the expanding agent develops an expansion pressure, so that the polyamide foams up and fills the mold. Polymerization, expansion and molding thus occur simultaneously if this method is followed.

Manufacture of expanded articles can also be carried out continuously by polymerizing the lactam melts containing catalyst and expanding agent in extrusion presses and forcing the viscous expandible melts out through dies. The lactam melt is preferably only partly polymerized in the extruder, polymerization being completed after extrusion, expansion occurring simultaneously. Extrusion may be onto supports, for example endless conveyor belts or rotary cylinders, the polymerization and expansion being allowed to proceed thereon. The supports are preferably heated or passed through heating chambers. Expansion need not of necessity be effected on supports. For example, extrusion may be vertically into a heated tube or a bath of liquid and porous profiles drawn off, as soon as they have sufficient strength. The expanding melts can be extruded, for example, in the form of sheeting, boards, tubes or strands, or surface coating or wire covering can also be produced in this way. Finally rotary molds can be filled periodically and emptied after the expansion. In continuous operation, a ready-made mixture containing catalyst and expanding agent may be fed to the extruder, or the additives, for example, expanding agent or polymerization activator, can be admixed in the extruder.

The process according to the invention enables expanded polyamide products to be manufactured which are of high molecular weight and which possess excellent mechanical properties.

The invention is illustrated by, but not limited to, the following examples, in which the parts are parts by weight.

EXAMPLE 1

A melt of 250 parts of caprylic lactam and 2 parts of sodium methylate, heated to 90° C., is mixed with a melt of 250 parts of caprylic lactam, 40 parts of caprolactam and 10 parts of bis-(caprylic lactam-N-carboxylic acid)-hexamethylene diamide, also heated to 90° C. The mixture is mixed with 1 part of azoisobutyronitrile and poured into a mold heated to 130° C. The mixture immediately commences to polymerize and expand. It forms an expanded article of bulk density 0.75. By the addition of 2, 3, 4, 8 or 10 parts of azoisobutyronitrile, expanded articles are obtained having bulk densities of 0.58, 0.49, 0.47, 0.24 or 0.21, respectively.

EXAMPLE 2

400 parts of caprolactam is melted at 80° C. and 20 parts of benzene added. The melt is heated to 130° C. and 1.5 parts of sodium methylate added. The mixture is left at this temperature until the sodium methylate is completely dissolved. Simultaneously, 100 parts of caprolactam in admixture with 15 parts of bis-(caprylic lactam - N - carboxylic acid)-hexamethylene diamide is melted and heated to 130° C. The two solutions are mixed with short intense stirring and immediately introduced into a 3-l. mold heated to 150° C. In exactly one minute the mass expands with a large increase in its viscosity and entirely fills the mold. After cooling, a molded article is obtained having a bulk density of 0.17.

EXAMPLE 3

400 parts of caprylic lactam is melted and 1.5 parts of sodium methylate added at 130° C. After the methylate has dissolved, the mixture is cooled to 80° C. and 20 parts of octane is added. Simultaneously, 100 parts of caprylic lactam, 20 parts of caprolactam and 10 parts of bis-(caprylic lactam-N-carboxylic acid)-hexamethylene diamide are melted and heated to 70° C. The two mixtures are stirred together and poured into a cold mold having a volume of 3 liters. The mass heats up rapidly, becomes viscous and expands to fill the mold completely. After cooling, an expanded article is obtained having a bulk density of 0.18.

EXAMPLE 4

400 parts of a mixture of equal parts of caprolactam and caprylic lactam is melted and 1.5 parts of sodium methylate dissolved in the melt at 130° C. After cooling to about 120° C. there are added in small quantities and with stirring 15 parts of heptane and then 3 parts of animal charcoal. No gas bubble formation is observed. Simultaneously, 100 parts of a mixture of equal parts of caprolactam and caprylic lactam is melted with 20 parts of bis-(caprylic lactam-N-carboxylic acid)-hexamethylene diamide and the melt is also heated to 130° C. The melts are mixed with good stirring and introduced immediately into a mold having a volume of 2.8 liters. The mass becomes viscous, rapidly expands and fills up the mold. The mold is kept hot for some time by external insulation, in order that the mixed polyamide may have time to harden, and only then is the expanded article removed from the mold. A very elastic expanded article having a bulk density of 0.19 is obtained.

EXAMPLE 5

500 parts of caprylic lactam is mixed with 1.2 parts of solid potassium hydroxide, heated to 130° C., and 20 parts of caprylic lactam is distilled off with the reaction water in vacuo. After cooling to about 70° C., 20 parts of cyclohexane is mixed in while stirring well. After further stirring and the addition of 1.5 parts of benzoyl chloride the mixture is introduced immediately into a metal mold heated to 150° C. After about 1 minute the mass becomes viscous and expands to fill the mold.

EXAMPLE 6

This example describes with reference to the accompanying drawing a continuous method of working the process according to the invention. In a vessel 1, provided with a stirrer, 300 parts of capyrylic lactam is melted and 3 parts of sodium methylate dissolved therein.

In a vessel 2, provided with a stirrer, there is prepared a melt of 200 parts of caprylic lactam, 40 parts of caprolactam, 13 parts of bis-(caprylic lactam-N-carboxylic acid)-hexamethylene diamide, 10 parts of heptane, 5 parts of octane and 35 parts of copper powder and, like the first melt, this is heated to 90° C.

Both melts are discharged separately into two storage containers 3 and 4. The storage containers are replenished intermittently. Two metering pumps 5 and 6 convey the two melts to a mixer 7 and from there into a heated extruder 8 in which the reaction material is heated to 95° C. The extruder is provided with a slot die 9 which is also heated.

During heating in the extruder the melt becomes viscous on account of the polymerization which sets in and in this state is discharged on to a thin heated conveyor belt 10. The reaction mass expands by the heat supplied from the sheet and by the polymerization heat.

What we claim is:

1. A process for the manufacture of cellular, expanded polyamides, which comprises intimately mixing a molten lactam with 7–13 ring members, said lactam ring members consisting of the

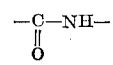

lactam group and methylene groups, and an alkaline reaction initiator selected from the group consisting of alkali metals, alkaline earth metals, and alkaline compounds of said metals with up to about 15% by weight, based on said lactam, of a blowing agent selected from the group consisting of volatile liquids which boil in the reaction mass at temperatures below the softening point of the resultant polyamide polymer but above the melting point of said lactam and compounds which decompose with evolution of gas at a temperature in the range of 100–180° C., and polymerizing said lactam at a polymerization temperature in the range of about 100–180° C. within a short period of a few minutes into a viscous mass while simultaneously evolving from said blowing agent bubbles of gas which are entrapped in said viscous mass and therey expand said mass, and, upon completion of said polymerization, cooling the resultant expanded polyamide mass to produce a cellular, solid polyamide of said lactam.

2. A process as claimed in claim 1 and further characterized by the step of distributing in said molten lactam very finely-divided, solid particles to promote the formation of homogeneous, fine cells in said polyamide when said lactam is polymerized and expanded by said bubbles of gas.

3. A process as claimed in claim 1 wherein a polymerization activator is mixed with said lactam before the polymerization thereof, said activator being a bis-(lactam-N-carboxylic acid)-hexamethylene diamide.

4. A process according to claim 1, wherein said polymerization of said lactam containing said blowing agent, said alkaline reaction initiator and a polymerization activator is conducted in a mold, and said lactam is polymerized and expanded therein.

5. A process according to claim 1, wherein said lactam melt containing said blowing agent and a catalyst is polymerized in an extruder, the viscous expansible melt is extruded through a die, and thereafter polymerization completed with expansion.

6. A process for the production of cellular polyamides which comprises admixing a lactam monomer with at least six carbon atoms in the lactam ring with an alkaline reaction initiator, a polymerization activator and a small amount up to 15% by weight, based on said lactam, of a blowing agent adapted to evolve a gas in the polymerization mass at the lactam polymerization temperature, and foaming the polymerization mass during the polymerization of said lactam at an elevated polymerization temperature by the evolution and entrapment of gas from said blowing agent in said polymerization mass to produce a cellular, expanded polyamide.

7. A process as claimed in claim 6 wherein the amount of said blowing agent is about 1 to 15 parts by weight per 100 parts by weight of said lactam.

8. A process for production of cellular, expanded polycaprolactam which comprises admixing caprolactam with an alkaline reaction initiator, a polymerization activator, and a small amount up to 15% by weight, based on said lactam, of a blowing agent adapted to provide a gas in the polymerization mass at the polymerization temperature, polymerizing said caprolactam at an elevated polymerization temperature, and evolving during the polymerization in the resultant viscous polymerization mass bubbles of gas from said blowing agent, thereby simultaneously polymerizing said caprolactam and foaming the polymerization mass to produce a cellular, expanded polycaprolactam.

9. A process as claimed in claim 8 wherein said polymerization temperature is in the range of 100–180° C. and said blowing agent comprises 1–15% by weight, based on said lactam of a volatile liquid which boils in said polymerization mass under the polymerization conditions.

10. A process as claimed in claim 8 wherein said polymerization temperature is in the range of 100–180° C. and said blowing agent comprises 1–15% by weight, based on said lactam of a solid compound which decomposes with evolution of gas in said polymerization mass under the polymerization conditions.

11. A process as claimed in claim 8 wherein said amount of said blowing agent is about 1–15% by weight, based on said lactam.

12. A process as claimed in claim 1 wherein molten caprolactam, said alkaline reaction, initiation, and a polymerization activator capable of promoting polymerization of said caprolactam are mixed intimately with about 1–15% by weight, based on said lactam, of said blowing agent prior to polymerization of said caprolactam.

References Cited

UNITED STATES PATENTS

| 2,681,321 | 6/1954  | Stastny        | 260—2.5 |
| 2,684,341 | 7/1954  | Anspon et al.  | 260—2.5 |
| 2,884,414 | 4/1959  | Indest et al.  | 260—78  |
| 3,036,046 | 5/1962  | Glickman et al.| 260—78  |
| 3,047,541 | 7/1962  | Ruffel et al.  | 260—78  |
| 2,268,160 | 12/1941 | Miles          | 260—2.5 |
| 2,241,321 | 5/1941  | Schlack        | 260—78  |
| 2,739,134 | 3/1956  | Parry et al.   | 260—2.5 |
| 3,051,665 | 8/1962  | Wismer et al.  | 260—2.5 |
| 3,060,135 | 10/1962 | Becke et al.   | 260—2.5 |
| 3,065,189 | 11/1962 | Becke et al.   | 260—2.5 |
| 3,017,391 | 1/1962  | Mottus et al.  | 260—3.5 |
| 3,072,584 | 1/1963  | Karpovich      | 260—2.5 |

FOREIGN PATENTS

| 820,607 | 9/1959 | Great Britain | 260—2.5N |

MURRAY TILLMAN, Primary Examiner

MORTON FOELAK, Assistant Examiner

U.S. Cl. X.R.

260—78

PO-1050
(5/69)

UNITED STATES PATENT OFFICE
CERTIFICATE OF CORRECTION

Patent No. 3,547,836          Dated December 15, 1970

Inventor(s) Horst Brueggemann et al

It is certified that error appears in the above-identified patent and that said Letters Patent are hereby corrected as shown below:

Column 1, line 8, in the heading, insert -- Claims priority application Belgium, September 27, 1960, 473,355 --; line 7 "hydrouls" should read -- hydrous --.

SIGNED AND
SEALED
MAR 9 1971

(SEAL)
Attest:

Edward M. Fletcher, Jr.
Attesting Officer

WILLIAM E. SCHUYLER,
Commissioner of Pate